Jan. 9, 1934.  B. A. WESCHE  1,942,585
SINGLE PHASE ELECTRIC MOTOR SPEED CONTROL
Filed July 6, 1931
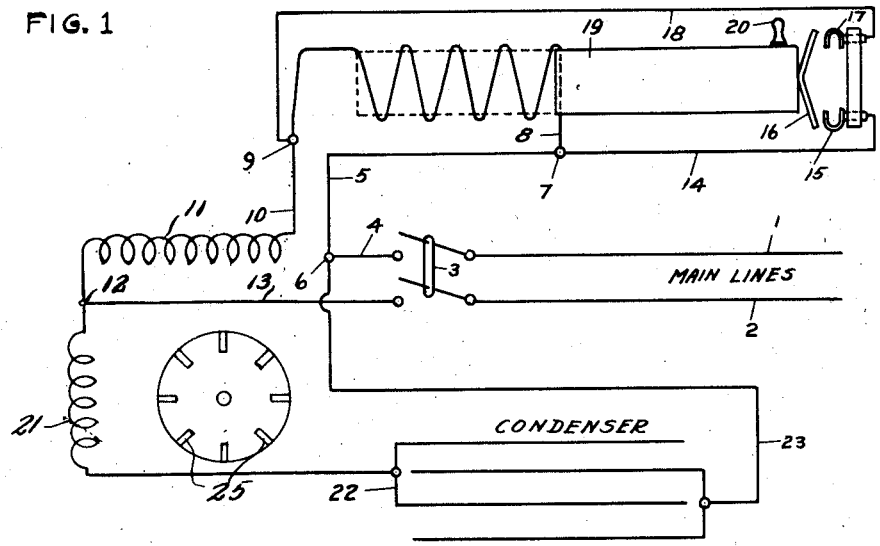
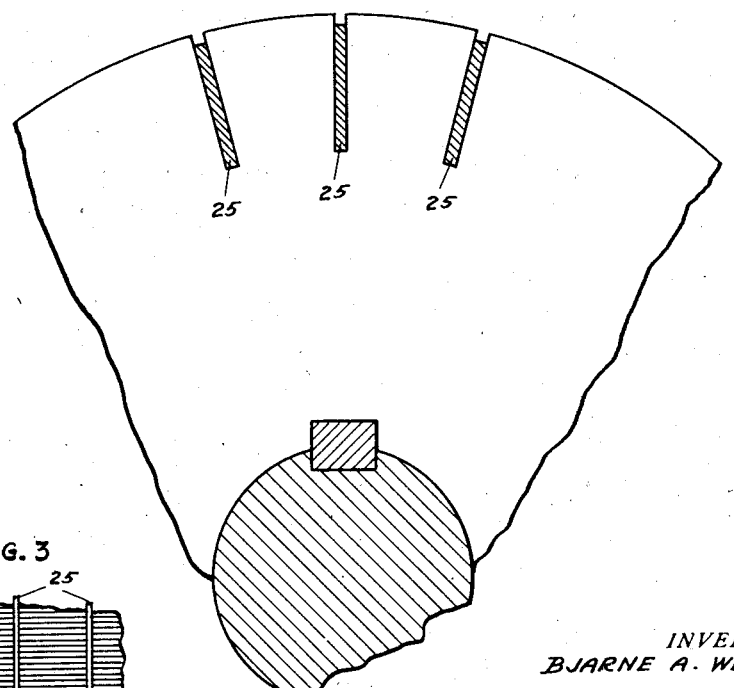
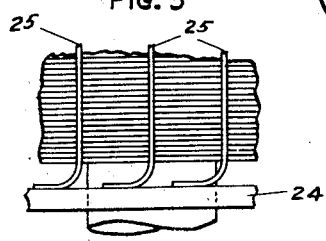
INVENTOR
BJARNE A. WESCHE.
BY Toulmin & Toulmin
ATTORNEY Patented Jan. 9, 1934

1,942,585

UNITED STATES PATENT OFFICE 1,942,585

SINGLE PHASE ELECTRIC MOTOR SPEED CONTROL

Bjarne A. Wesche, Cincinnati, Ohio

Application July 6, 1931. Serial No. 548,763

13 Claims. (Cl. 172—275)

My invention relates to a speed control for a single phase motor after the motor is started.

The object of my invention is to provide means of accurately controlling the speed during the operation of a single phase motor, particularly a motor with a rotor having a high inductance.

It should be understood that my invention does not deal with the starting of motors but only with the control of speed after the motor has been started.

It is an object to vary the speed and the applied voltage together so that as the applied voltage goes down the speed goes down, and vice versa. The main line supply voltage remains constant. This is a companion application of my copending application Ser. No. 368,599.

Referring to the drawing, Figure 1 is a diagram of the motor circuit I employ with my speed control circuit and apparatus.

Figure 2 is a section through a portion of a typical rotor having a high reactance due to the use of deep slots and copper bars of great depths in the slots.

Figure 3 is a plan view of one end of the copper rotor bars showing the means of connecting them to an end ring.

Referring to the drawing in detail, 1 and 2 indicate the main power lines which are controlled by the knife switch 3. One line is connected through the switch as at 4 to the line 5 at the terminal 6. Into this line is connected as at 7 one end of the coil 8, which is connected at its other end 9 to the line 10 that forms one end of the primary winding 11, the other end of which is connected to the terminal 12 which in turn connects with the line 13. The line 13 is connected by the switch 3 to the main line 2.

The coil 8 is adapted to be short-circuited by the line 14, switch contact 15, switch 16, switch contact 17, and line 18 which connects with the line 10 at the terminal 9 and also with the end of the coil 8. The switch 16 is mounted upon the iron core 19 which is adjustable within the coil 8 and is controlled by the handle 20.

The condenser circuit comprises an auxiliary primary winding 21 in series with a condenser and is connected at one end to the terminal 12 and its other end to one side of the condenser 22. The condenser 22 is connected on its other side by the line 23 to the terminal 6. The condenser in the auxiliary primary winding produces a leading current in the circuit which sets up a flux out of time phase with the flux set up by the current in the main primary winding. Thus a shifting magnetic field is produced of well known characteristics.

I have thus provided a primary winding circuit with a speed control coil and a variable inductance due to the position of the core 19; a short-circuiting circuit and switch associated with the core 19; and an auxiliary winding having a circuit with a condenser therein.

The field strength of the motor is varied by the variable inductance of the coil 8 and the core 19. I get an additional reactance effect in order to get high impedance of the motor winding by having a high inductance rotor with deep copper bars and deep slots. The high inductance rotor has at low speed a high percentage of slip with a low power factor. I provide high power and high efficiency at full load.

In operation after the motor is started, I vary its speed by moving the core 19 by means of the handle 20. In the dotted line position with the core fully within the coil the motor is turned over at its lowest speed, which increases as the core is withdrawn from the coil until the entire coil is short-circuited by the closure of the switch 16 engaging the contact terminals 15 and 17. I am thus enabled by a very simple mechanism to control the speed of the motor without modifying its other characteristics through the full range of its speed and by means of a single handle that can be quickly and simply operated.

24 indicates an end ring to which the ends of the bars 25 are connected.

It will be understood that the main line voltage remains constant and I do not provide any means for controlling the main line voltage nor do I provide any means for controlling the rotor circuit, but I confine my control to the stator circuit. It is my object to provide an auxiliary primary condenser circuit of constant valuation, a main line circuit of constant line voltage and a variable primary circuit. The condenser in the auxiliary primary winding 21 causes a leading current in this circuit, which sets up a flux out of time phase with the flux set up by the current in the primary circuit 11. The fluxes thus set up by the currents in the primary windings are displaced in space and in time phase, and produce a shifting magnetic field. The secondary winding carried by the rotor is a short-circuited winding of which the effective resistance is changed inductively. For this purpose the secondary winding has considerable inductance and therefore high impedance at starting, and low impedance at running speed.

The amount of displacement between the primary windings may be varied by varying the inductance in one primary winding. My condenser circuit secures a displacement in the nature of a second phase so as to get easy starting of the rotor by having a phase displacement.

It will be further understood that I desire to comprehend within my invention such modifications as may be clearly embraced within the scope of my claim and invention.

Having thus fully described my invention, what

I claim as new and desire to secure by Letters Patent, is:—

1. In combination, a primary field winding forming a motor stator circuit, a main line supply circuit connected thereto, a variable inductance coil and a variable position core movable therein connected into said stator field primary winding circuit, and a circuit having permittance therein connected to said stator winding circuit and to the main line circuit, and means for increasing the impedance of said winding comprising a high inductance rotor.

2. The combination in an alternating current motor of the squirrel cage type, a main primary winding and an auxiliary primary winding circuit connected in parallel therewith, said auxiliary winding circuit including a condenser, a high resistance secondary having the characteristics of a deep and narrow conductor secondary, and a variable inductance connected into the primary circuit whereby the motor speed is adjusted.

3. The combination in an alternating current motor of the squirrel cage type, a main primary winding and an auxiliary primary winding circuit connected in parallel therewith, said auxiliary winding circuit including a reactance element, a high resistance secondary having the characteristics of a deep and narrow conductor secondary, and a variable inductance connected into the primary circuit whereby the motor speed is adjusted.

4. In combination in a single phase induction motor, a main primary winding and an auxiliary primary winding circuit connected in parallel therewith, said auxiliary winding circuit including a reactance element, and a variable inductive reactance connected in series to said primary windings, and means for increasing the impedance of said windings comprising a high inductance rotor.

5. In combination in a single phase induction motor, a main primary winding and an auxiliary primary winding circuit connected in parallel therewith, said auxiliary winding circuit including a reactance element, a high resistance deep and narrow conductor rotor, and an adjustable inductive reactance in the main primary winding circuit whereby the speed of the motor is adjusted.

6. In combination in an alternating current motor of the squirrel cage type, a main primary winding and an auxiliary primary winding circuit connected in parallel therewith, said auxiliary winding circuit including a reactance element, a high reactance secondary having the characteristics of a deep and narrow conductor secondary, and a variable inductance connected into the primary circuit whereby the motor speed is adjusted.

7. In combination in an alternating current motor of the squirrel cage type, a main primary winding and an auxiliary primary winding circuit connected in parallel therewith, said auxiliary winding circuit including a condenser, a high reactance secondary having the characteristics of a deep and narrow conductor secondary, and a variable inductance connected into the primary circuit whereby the motor speed is adjusted.

8. In combination in an alternating current motor, a main primary winding circuit and an auxiliary primary winding circuit connected in parallel therewith, said auxilary winding circuit including a reactance element, a variable inductance connected into the main field winding circuit whereby the stator field strength may be varied by adjusting said inductance therein, said motor having relatively deep and narrow rotor bars whereby to utilize eddy current losses in said bars at low speed.

9. In combination in an alternating current motor, a main primary winding circuit and an auxiliary primary winding circuit connected in parallel therewith, said auxiliary winding circuit including a condenser, a variable inductance connected into the main field winding circuit whereby the stator field strength may be varied by adjusting said inductance therein, said motor having relatively deep and narrow rotor bars whereby to utilize eddy current losses in said bars at low speed.

10. In combination in an alternating current motor, a main primary winding and an auxiliary primary winding circuit connected in parallel therewith, said auxiliary winding circuit including a reactance element, an inductance coil connected to said main primary winding, a core movable in said coil, a high reactance rotor having relatively deep and narrow bars and a supply line of substantially constant voltage connected across the main primary winding and the inductance coil in series, so that variations in the position of said coil and the core will vary the speed of the motor and vary the voltage supplied from the inductance so that the speed and voltage vary together.

11. In combination in an alternating current motor of the squirrel cage type, a main primary winding circuit and an auxiliary primary winding circuit connected in parallel therewith, said auxiliary winding circuit including a reactance element, a squirrel cage secondary comprising a rotor having relatively deep and narrow bars, and having a high resistance, and a variable inductance connected into said main primary winding circuit whereby full advantage of the eddy current losses can be secured in said reactor at low speeds.

12. In combination in an alternating current motor of the squirrel cage type, a main primary winding circuit and an auxiliary primary winding circuit connected in parallel therewith, said auxiliary winding circuit including a condenser a squirrel cage secondary comprising a rotor having relatively deep and narrow bars, and having a high resistance, and a variable inductance connected into said main primary winding circuit whereby full advantage of the eddy current losses can be secured in said reactor at low speeds.

13. In combination in an alternating current motor, a main primary winding and an auxiliary primary winding circuit connected in parallel therewith, said auxiliary winding circuit including a reactance element, an inductance coil connected to said main primary winding, a core movable in said coil, a circuit connected to said coil and a switch for closing said circuit, said switch being carried by said core and adapted to be closed by said core at its outermost position out of said coil, a high reactance rotor having relatively deep and narrow bars and a supply line of substantially constant voltage connected across the main primary winding and the inductance coil in series, so that variations in the position of said coil and the core will vary the speed of the motor and vary the voltage supplied from the inductance so that the speed and voltage vary together.

BJARNE A. WESCHE.